United States Patent [19]

Martin

[11] Patent Number: 4,951,788

[45] Date of Patent: Aug. 28, 1990

[54] TORQUE CONVERTER MULTIPLATE BYPASS CLUTCH

[75] Inventor: Dale E. Martin, Novi, Mich.

[73] Assignee: Ford Motor Company, Dearborn, Mich.

[21] Appl. No.: 372,486

[22] Filed: Jun. 28, 1989

[51] Int. Cl.$^5$ ............................................. F16H 45/02
[52] U.S. Cl. ..................................... 192/3.3; 192/3.29
[58] Field of Search ..................... 192/3.21, 3.28, 3.29, 192/3.3, 3.33

[56] References Cited

U.S. PATENT DOCUMENTS

| | | | |
|---|---|---|---|
| 2,620,684 | 12/1952 | McFarland | 192/3.3 X |
| 3,252,352 | 5/1966 | General et al. | 74/645 |
| 4,033,436 | 7/1977 | Hoetger et al. | 192/3.3 |
| 4,082,011 | 4/1978 | McQuinn et al. | 192/3.3 X |
| 4,199,047 | 4/1980 | Ling | 192/3.3 |
| 4,509,389 | 4/1985 | Vahratian et al. | 74/695 |
| 4,613,022 | 9/1986 | Nishimura | 192/3.29 |
| 4,706,790 | 11/1987 | Lockhart et al. | 192/3.3 |

Primary Examiner—Richard Lorence
Attorney, Agent, or Firm—Donald J. Harrington; Frank G. McKenzie; Keith L. Zerschling

[57] ABSTRACT

A hydrokinetic torque converter having a lock-up clutch that connects drivably the torque converter turbine and the torque converter impeller wherein the clutch includes a bypass clutch piston and multiple disc friction elements, the latter being radially located inward of the clutch piston, alternate ones of the friction discs being connected to the turbine and the companion discs being connected to a clutch cylinder, a bypass clutch piston being positioned in the cylinder to define a pressure chamber on one side of the piston adjacent the converter housing, the opposite side of the piston being exposed to circuit pressure in the torque converter, and radially inwardly projecting clutch actuator elements extending through registering slots in the clutch cylinder whereby improved converter efficiency and vehicle drivability is achieved.

8 Claims, 2 Drawing Sheets

TORQUE CONVERTER MULTIPLATE BYPASS CLUTCH

BACKGROUND OF THE INVENTION

My invention comprises improvements in a hydrokinetic torque converter transmission of the kind shown in U.S. Pat. No. 4,509,389. That patent describes a planetary transaxle having two simple planetary gear sets, a final drive and a differential assembly on one axis and a converter and converter lock-up clutch arranged on a spaced, parallel axis, the latter corresponding to the axis of the crankshaft of an internal combustion engine. A drive chain and sprocket assembly transfers torque from the turbine of the torque converter to torque input elements of the gearing.

The lock-up clutch for the torque converter of U.S. Pat. No. 4,509,389 includes a damper assembly that is intended to cushion and to dampen torsional vibrations resulting from engine torque fluctuations, and from inertia torque disturbances transmitted through the clutch. The lock-up clutch of the '389 patent includes a piston plate having a friction surface situated at a radially outward location and a friction surface on the adjacent wall of the impeller housing for the torque converter.

The clutch piston and the adjacent wall of the impeller housing define a control pressure chamber. Control pressure in the control pressure chamber establishes a clutch release force on the clutch piston. Control pressure is supplied to the pressure chamber through porting in sleeve shafts extending through the converter. The fluid supplied to that chamber flows across the friction surfaces of the lock-up clutch piston. Radial flow through the pressure chamber and across the friction surfaces establishes a control force that tends to release the clutch. That flow is added to the torus circuit supply fluid which is distributed through the torus circuit through other annular passages in the sleeve shaft arrangement for the converter. The torus flow through the converter exits through an exhaust flow path which communicates with a transmission oil cooler.

An early prior art teaching of a clutch of this kind is shown in General et al., U.S. Pat. No. 3,252,352. That patent also describes a clutch plate which is actuated by circuit pressure within the torus circuit of a converter. The clutch is released as pressure is admitted to the annular space defined by the piston and the adjacent impeller wall. Later examples of converters with lock-up clutches of this kind may be seen in U.S. Pat. Nos. 4,271,939, 3,977,502 and 3,730,315.

The '502 patent and the '315 patent show lock-up clutches that are designed to accommodate a continuous slip so that a portion of the torque transferred from the engine through the converter is distributed mechanically through the slipping clutch and the balance of the torque is distributed hydrokinetically through the torque converter. In each instance, the torque output element of the clutch is connected to the turbine shaft so the mechanical portion of the torque flow path is additive with respect to the hydrokinetic torque flow path.

BRIEF DESCRIPTION OF THE INVENTION

The improved lock-up clutch arrangement of my invention includes a lock-up piston located at a radially outward location within the impeller housing and multiple clutch plates and separator plates situated radially inward with respect to the piston within the torque converter housing. Provision is made for supplying fluid pressure to a working space defined by the clutch piston and the adjacent wall of the impeller housing. Unlike the design of the '389 patent, there is no continuous flow through the working space behind the clutch piston.

The radially inward portion of the clutch piston defines a clutch actuator and a friction disc retainer. This portion of the clutch piston extends into a slotted portion in the clutch cylinder so that the clutch piston rotates with the clutch cylinder and is restrained against relative angular displacement, one with respect to the other. The radial disposition of the piston with respect to the friction discs minimizes the axial dimensions of the lock-up clutch assembly, although the capacity of the lock-up clutch assembly is not reduced relative to the capacity of those clutch arrangements described in the prior art references where the radius of the friction material is greater than it is in the construction of my invention.

The retainer elements of the clutch piston also serve as actuator springs which cause a smooth engagement of the clutch. It is possible further for the cooling oil to be distributed to the friction discs and transferred across the relatively movable surfaces of the discs and distributed through the slotted openings in the clutch piston and through into the torus circuit of the converter. This provides increased oil flow through the clutch, thereby making it possible to maintain adequate cooling. This makes it possible also to provide a continuously slipping clutch as is the case, for example, with the clutch construction of the '502 patent mentioned above. The heat that would be generated because of the continuous slipping action will not result in an undesirable temperature build-up because of the adequate flow of cooling oil that is allowed to pass through the clutch assembly.

If increased clutch capacity is required, it is merely necessary to increase the number of friction discs. This may be done without increasing the axial length of the lock-up clutch assembly.

PARTICULAR DESCRIPTION OF THE INVENTION

Figure 2:
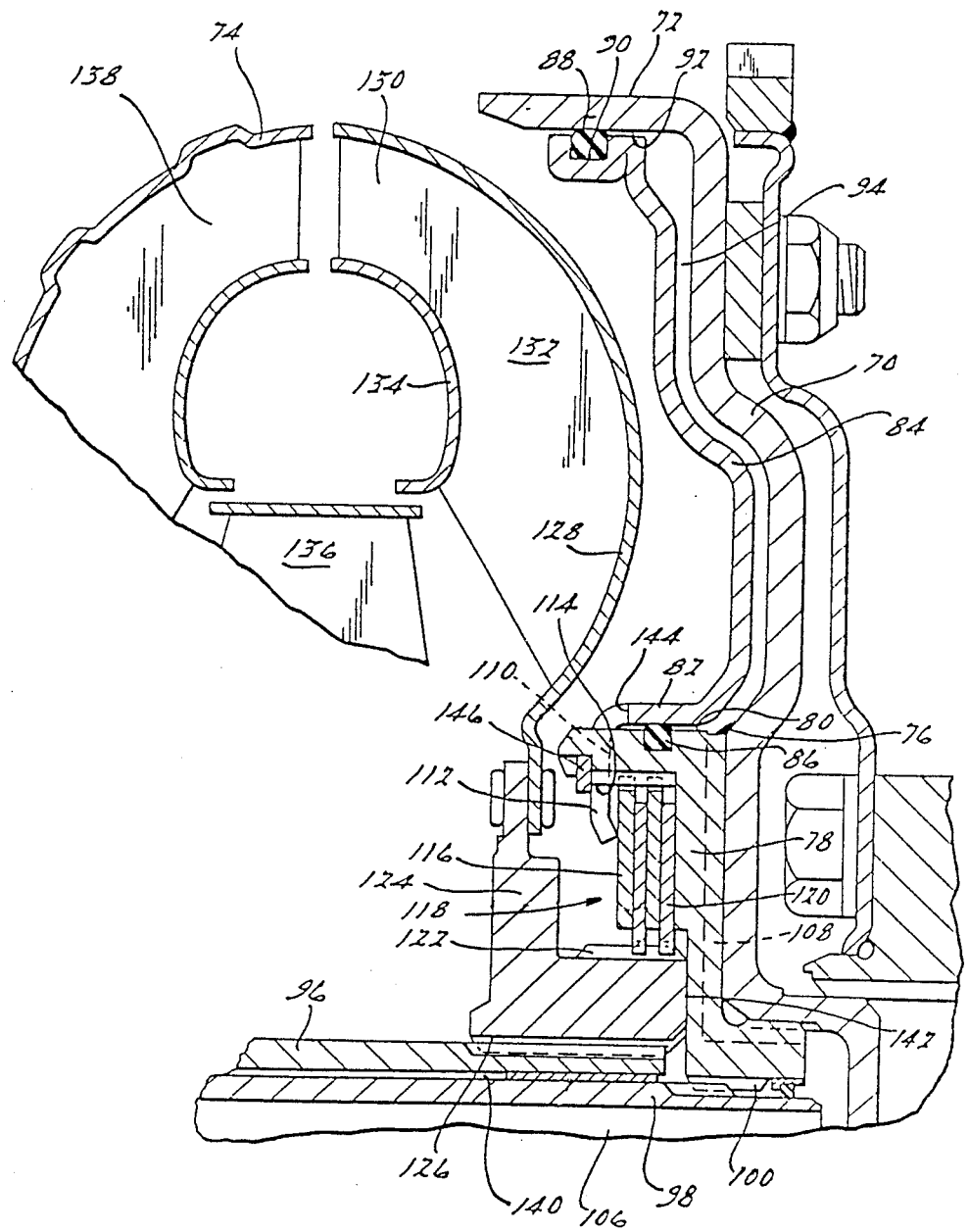
FIG. 2 shows the improved lock-up clutch assembly of my invention wherein the bypass clutch piston is located radially outward of bypass clutch friction plates.

For purposes of establishing a structural environment for the improvement of my invention, which will be described with reference to FIG. 2, I will describe here the prior art construction of a known transmission that has a lock-up converter for a hydrokinetic torque converter.

Figure 1:
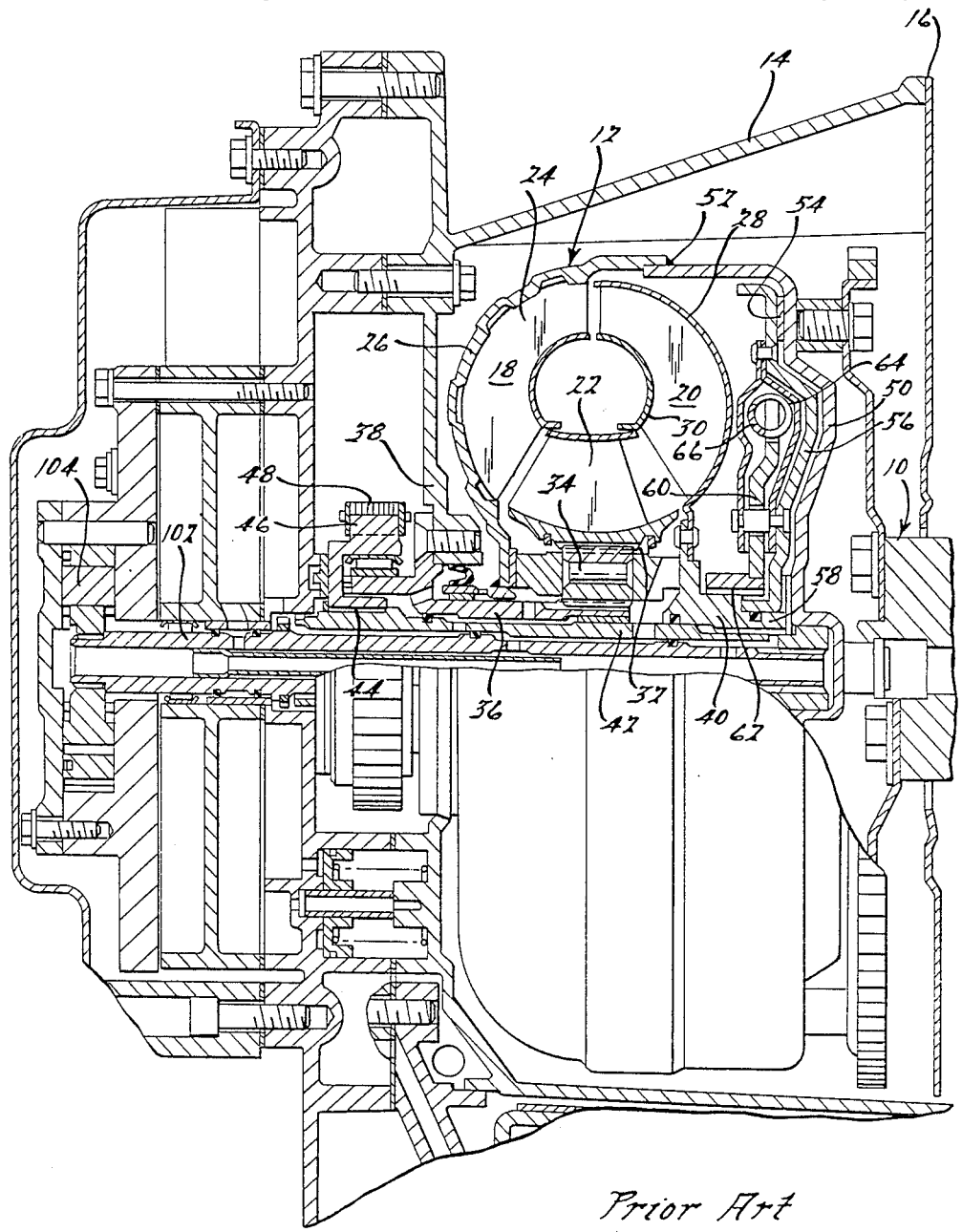
FIG. 1 shows a prior art torque converter and lock-up clutch assembly of the kind disclosed in U.S. Pat. No. 4,509,389.

Numeral 10 in FIG. 1 designates the end of an engine crankshaft and numeral 12 designates a hydrokinetic torque converter mounted on the axis of the crankshaft. A torque converter housing 14 is adapted to be bolted to the engine housing at its margin 16.

Torque converter 12 includes an impeller 18, a turbine 20 and a bladed reactor 22. The impeller 18 has toroidal outflow blades 24 secured to the interior of the impeller housing 26. Turbine 20 has radial inflow blades disposed between outer turbine shroud 28 and inner turbine shroud 30. Reactor 22 includes blades supported by reactor hub 32. They are situated between the flow exit section of the turbine 20 and the flow entrance section of the impeller 18. Reactor 22 includes an overrunning brake 34 in the hub 32, which accommodates one-way torque delivery to a stationary reactor sleeve shaft 36, the latter being connected to a support wall 38 which forms a part of the housing 14.

Turbine 20 has a turbine hub 40 to which the inner margin of the outer shroud 28 of the turbine 20 is secured. Turbine hub 40 is splined to the turbine sleeve shaft 42.

Sleeve shaft 42 is journalled in the reactor support sleeve shaft 36 and is splined at 44 to a chain drive sprocket 46 which is supported by the support wall 38. A drive chain 48 transfers torque from the turbine shaft to a multiple ratio gear assembly, not shown, which is arranged on an axis parallel to the axis of the converter.

Numeral 50 designates the forward wall of the converter housing which is welded at its outer margin 52 to the impeller housing 26. The converter housing is formed with an annular friction surface 54 at a radially outward location. That surface is adapted to be engaged by the friction surface of a lock-up clutch piston plate 56. The inner margin of the piston plate 56 is mounted on an extension of the turbine hub 40, shown at 58, and is adapted to move axially with respect to the turbine hub 40.

A damper driven plate 60 is splined at 62 to the turbine hub 40. A damper driving plate 64 is secured to a radially outward portion of the lock-up clutch piston plate 56. Damper springs 66 establish a resilient connection between driving plate 64 and the driven plate 60. For an understanding of the mode of operation of a damper of this general type, reference may be made to U.S. Pat. Nos. 2,574,573 and 4,304,107, as well as previously mentioned U.S. Pat. No. 4,509,389.

The clutch plate 56 is urged into engagement with the converter housing by the circuit pressure in the torus circuit for the converter 12. When control pressure is supplied to the annular space between the piston plate 56 and the wall 50 of the converter housing, fluid flow is passed across the friction surfaces of the converter housing and the piston plate, thereby releasing the clutch. The fluid that passes across the friction surfaces in a radially outward direction is added through the flow normally distributed through the torus circuit, and the combined flow then passes out from the torus circuit through the flow return passage.

The improvements of my invention may be used in the environment described with reference to FIG. 1. The improvements are shown in FIG. 2. Numeral 70 shows the converter housing wall. The radially outward portion 72 of the converter housing 70 is adapted to be welded in the manner shown in the prior art design of FIG. 1 to an impeller housing 74.

The radially inward portion of the converter housing 70 is welded at 76 to a clutch cylinder member 78. This cylinder member has an annular surface 80 over which the hub portion 82 of a piston plate 84 is positioned. A seal ring 86 located in a seal ring groove in the surface 80 provides an axially sliding seal for the hub 82. An axial sliding seal ring 88 is located in a seal ring groove 90 in the radially outward portion of the piston plate 84. It is adapted to engage an annular surface 92 which, together with the surface 80 and the inner wall of the converter housing 70, define an annular clutch pressure chamber 94.

A transmission turbine sleeve shaft is shown at 96. A transmission pump drive shaft 98 is splined at 100 to a splined central opening in the clutch cylinder member 78. That pump drive shaft corresponds to pump drive shaft 102 in the prior art construction of FIG. 1. A control pump 104, as seen in FIG. 1, is adapted to be driven by drive shaft 102.

Shaft 98 is a sleeve shaft. A control oil pressure distributor passage 106 is defined by the central opening of the shaft 98. Control oil pressure is distributed through passage 106 and through a radial passage 108 formed in the clutch cylinder member 78. Radial passage 108 communicates with the pressure chamber 94.

The radially outward portion of the clutch cylinder member 78 is provided with slots 110 at angularly spaced locations about the axis of the converter. Each slot is adapted to receive a radially inwardly extending projection 112 formed on the inner margin of the piston plate 84. Thus, the piston plate 84 may rotate with the impeller housing, although relative axial movement of the piston plate 84 with respect to the clutch cylinder member 78 is accommodated by the connection 110 and 112.

Clutch cylinder member 78 is provided with an inner cylindrical surface 114. Axially extending splines are formed in the surface 114 to establish a connection with externally splined separator plates 116 of the multiple disc clutch assembly 118. Internally splined clutch discs 120 are splined to an externally splined portion 122 of turbine hub 124. A turbine shaft 96 is splined to the turbine hub 124 at 126.

Turbine hub 124 is riveted to the radially inward portion of outer shroud 128 of turbine 130. Radial outflow turbine blades 132 are disposed between outer shroud 128 and inner shroud 134. The radial inflow for the turbine 130 is received by the flow entrance section of stator 136. The impeller 138 receives the toroidal flow at the exit section of the stator 136 and the flow traverses the circuit through the impeller in a radially outward direction.

Cooling oil is distributed to the multiple clutch discs through the annular passage 140 defined by concentric sleeve shafts 96 and 98. A cooling oil flow passage 142 communicates with the passage 140. The flow of cooling oil past the friction discs enters the torus cavity of the converter through openings 144 at the base of the piston plate 84. Those openings are defined by the tabs or projections 112 and by the registering slots 110 in the clutch cylinder member 78.

The inner cylindrical surface 114 is provided with a snap ring groove in which is positioned snap ring 146 which retains the piston plate 84. Separator plates 116 and clutch discs 120 are retained by the projections 112. Thus, the projections 112 act as a clutch plate actuator as well as a retainer for the clutch plates 116 and discs 120.

By controlling the pressure in the cavity 94, the engaging force of the friction plates can be controlled. The circuit pressure establishes a pressure force on the piston plate to apply the clutch. The control pressure in the cavity 94 releases the clutch. The pressure ratio across the piston plate can be controlled to establish a continuous slipping of the clutch discs, thus reducing engine torsional distrubances and increasing the torque transmitting capacity and torque multiplication efficiency. A portion of the driving torque that is not distributed to the clutch disc is transmitted hydrokinetically through the converter to the turbine sleeve shaft 96.

The projections 112 serve as a clutch plate actuator. They serve also as a spring. Since they are flexible, they may apply the clutch plate with a smooth engagement characteristic.

A radial disposition of the clutch piston plate 84 with respect to the friction discs reduces the axial stack-up dimension, thereby making the assembly feasible for packaging in the available space of a compact automobile engine and transmission compartment. Furthermore, the use of the clutch cylinder as a reaction plate eliminates the need for providing a separate reaction plate, thereby further reducing the axial dimensions. The reaction plate provided by the clutch cylinder is the radial plate situated directly adjacent the friction discs.

Increased oil flow may be circulated through the torus circuit because of the open flow of a passage provided by the slot and projections. The slots 144 receive projections 112.

If it is desired to increase the torque capacity of the clutch, it is merely necessary to add additional friction plates.

Having described a preferred form of my invention, what I claim and desire to secure by U.S. Letter Patent is:

1. A torque converter assembly having a bypass clutch, said converter assembly comprising a bladed turbine including a turbine hub, a bladed impeller, a converter housing enclosing said turbine and said impeller, an annular piston plate located between said turbine and said converter housing a clutch pressure chamber defined between said piston plate and said converter housing, said pressure chamber having a radially outer margin and a radially inner margin, said inner margin being defined by a cylinder member having apertures at a location spaced axially toward said turbine from said housing, said cylinder member being connected to said housing;
   said annular piston plate having projections extending radially inward through said apertures, an assembly of friction clutch discs located within said cylinder member, said projections engaging said friction disc assembly;
   at least one of said friction discs being carried by said cylinder member and an adjacent disc carried by said turbine hub, and a turbine sleeve shaft connected to said turbine hub.

2. A torque converter assembly having a bypass clutch, said converter assembly comprising a bladed turbine including a turbine hub, a bladed impeller, a converter housing enclosing said turbine and said impeller, an annular piston plate located between said turbine and said converter housing a clutch pressure chamber defined between said piston plate and said converter housing, said pressure chamber having a radially outer margin and a radially inner margin, said inner margin being defined by a cylinder member connected to said housing and having apertures at a location spaced axially toward said turbine from said housing;
   said annular piston plate having projections extending radially inward through said apertures, an assembly of friction clutch discs located within said cylinder member, said projections engaging said friction disc assembly;
   at least one of said friction discs being carried by said cylinder member and an adjacent disc carried by said turbine hub, and a turbine sleeve shaft connected to said turbine hub;
   said cylinder member having a friction reaction surface adjacent one of said discs whereby said bypass clutch assembly requires a minimal axial width.

3. A torque converter assembly having a bypass clutch, said converter assembly comprising a bladed turbine including a turbine hub, a bladed impeller, a converter housing enclosing said turbine and said impeller, an annular piston plate located between said turbine and said converter housing a clutch pressure chamber defined between said piston plate and said converter housing, said pressure chamber having a radially outer margin and a radially inner margin, said inner margin being defined by a cylinder member connected to said housing and having apertures at a location spaced axially toward said turbine from said housing;
   said annular piston plate having projections extending radially inward through said apertures, an assembly of friction clutch discs located within said cylinder member, said projections engaging said friction disc assembly;
   at least one of said friction discs being carried by said cylinder member and an adjacent disc carried by said turbine hub, and a turbine sleeve shaft connected to said turbine hub;
   said piston plate being located radially outward of said friction discs and said turbine hub extending within said cylinder member, alternate ones of said discs being carried by said turbine hub and the others being carried by said cylinder member.

4. A torque converter assembly having a bypass clutch, said converter assembly comprising a bladed turbine including a turbine hub, a bladed impeller, a converter housing enclosing said turbine and said impeller, an annular piston plate located between said turbine and said converter housing a clutch pressure chamber defined between said piston plate and said converter housing, said pressure chamber having a radially outer margin and a radially inner margin, said inner margin being defined by a cylinder member connected to said housing and having apertures at a location spaced axially toward said turbine from said housing;
   said annular piston plate having projections extending radially inward through said apertures, an assembly of friction clutch discs located within said cylinder member, said projections engaging said friction disc assembly;
   at least one of said friction discs being carried by said cylinder member and an adjacent disc carried by said turbine hub, and a turbine sleeve shaft connected to said turbine hub;
   said cylinder member having a friction reaction surface adjacent one of said discs whereby said bypass clutch assembly requires a minimal axial width;
   said piston plate being located radially outward of said friction discs and said turbine hub extending within said cylinder member alternate ones of said discs being carried by said turbine hub, and the others being carried by said cylinder member.

5. A torque converter assembly having a bypass clutch, said converter assembly comprising a bladed turbine including a turbine hub, a bladed impeller defining a torus fluid flow circuit, a converter housing enclosing said turbine and said impeller, an annular piston plate located between said turbine and said converter housing a clutch pressure chamber defined between said piston plate and said converter housing, said pressure chamber having a radially outer margin and a radially inner margin, said inner margin being defined by a cylinder member connected to said housing and having apertures at a location spaced axially toward said turbine from said housing;
- said annular piston plate having projections extending radially inward through said apertures, an assembly of friction clutch discs located within said cylinder member, said projections engaging said friction disc assembly;
- at least one of said friction disc being carried by said cylinder member and an adjacent disc carried by said turbine hub, and a turbine sleeve shaft connected to said turbine hub;
- a control pressure passage extending axially through said turbine shaft and radially through said cylinder member to said pressure chamber defined by said piston and said converter housing.

6. A torque converter assembly having a bypass clutch, said converter assembly comprising a bladed turbine including a turbine hub, a bladed impeller defining a torus fluid flow circuit, a converter housing enclosing said turbine and said impeller, an annular piston plate located between said turbine and said converter housing a clutch pressure chamber defined between said piston plate and said converter housing, said pressure chamber having a radially outer margin and a radially inner margin, said inner margin being defined by a cylinder member connected to said housing and having apertures at a location spaced axially toward said turbine from said housing;
- said annular piston plate having projections extending radially inward through said apertures, an assembly of friction clutch discs located within said cylinder member, said projections engaging said friction disc assembly;
- at least one of said friction discs being carried by said cylinder member and an adjacent disc carried by said turbine hub, and a turbine sleeve shaft connected to said turbine hub;
- said cylinder member having a friction reaction surface adjacent one of said discs whereby said bypass clutch assembly requires a minimal axial width;
- a control pressure passage extending axially through said turbine shaft and radially through said cylinder member to said pressure chamber defined by said piston and said converter housing.

7. A torque converter assembly having a bypass clutch, said converter assembly comprising a bladed turbine including a turbine hub, a bladed impeller defining a torus fluid flow circuit, a converter housing enclosing said turbine and said impeller, an annular piston plate located between said turbine and said converter housing a clutch pressure chamber defined between said piston plate and said converter housing, said pressure chamber having a radially outer margin and a radially inner margin, said inner margin being defined by a cylinder member connected to said housing and having apertures at a location spaced axially toward said turbine from said housing;
- said annular piston plate having projections extending radially inward through said apertures, an assembly of friction clutch discs located within said cylinder member, said projections engaging said friction disc assembly;
- at least one disc being carried by said cylinder member and an adjacent disc carried by said turbine hub, and a turbine sleeve shaft connected to said turbine hub;
- said piston plate being located radially outward of said friction discs and said turbine hub extending within said cylinder member, alternate ones of said discs being carried by said turbine hub and the others being carried by said cylinder member;
- a control pressure passage extending axially through said turbine shaft and radially through said cylinder member to said pressure chamber defined by said piston and said converter housing.

8. A torque converter assembly having a bypass clutch, said converter assembly comprising a bladed turbine including a turbine hub, a bladed impeller defining a torus fluid flow circuit, a converter housing enclosing said turbine and said impeller, an annular piston plate located between said turbine and said converter housing a clutch pressure chamber defined between said piston plate and said converter housing, said pressure chamber having a radially outer margin and a radially inner margin, said inner margin being defined by a cylinder member connected to said housing and having apertures at a location spaced axially toward said turbine from said housing;
- said annular piston plate having projections extending radially inward through said apertures, an assembly of friction clutch discs located within said cylinder member, said projections engaging said friction disc assembly;
- at least one of said friction discs being carried by said cylinder member and an adjacent disc carried by said turbine hub, and a turbine sleeve shaft connected to said turbine hub;
- said cylinder member having a friction reaction surface adjacent one of said discs whereby said bypass clutch assembly requires a minimal axial width;
- said piston plate being located radially outward of said friction discs and said turbine hub extending within said cylinder member, alternate ones of said discs being carried by said turbine hub and the others being carried by said cylinder member;
- a control pressure passage extending axially through said turbine shaft and radially through said cylinder member to said pressure chamber defined by said piston and said converter housing.

* * * * *

UNITED STATES PATENT AND TRADEMARK OFFICE
CERTIFICATE OF CORRECTION

PATENT NO. : 4,951,788

DATED : August 28, 1990

INVENTOR(S) : Dale E. Martin

It is certified that error appears in the above-identified patent and that said Letters Patent is hereby corrected as shown below:

Column 2, line 1, before "inward" insert --outward location within the impeller housing and multiple clutch plates and separator plates situated radially--.

Column 7, claim 5, line 13, "disc" should be --discs--.

Column 8, claim 7, line 10, after "one" delete "disc" and insert --of said friction discs--.

Signed and Sealed this

Twenty-eighth Day of January, 1992

Attest:

HARRY F. MANBECK, JR.

*Attesting Officer*   *Commissioner of Patents and Trademarks*